United States Patent
Kohara

(10) Patent No.: US 9,039,400 B2
(45) Date of Patent: May 26, 2015

(54) RIGID CORE FOR FORMING TIRE

(71) Applicant: SUMITOMO RUBBER INDUSTRIES, LTD., Kobe-shi, Hyogo (JP)

(72) Inventor: Kei Kohara, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 14/379,153

(22) PCT Filed: Feb. 27, 2013

(86) PCT No.: PCT/JP2013/055137
§ 371 (c)(1),
(2) Date: Aug. 15, 2014

(87) PCT Pub. No.: WO2013/140964
PCT Pub. Date: Sep. 26, 2013

(65) Prior Publication Data
US 2015/0037443 A1    Feb. 5, 2015

(30) Foreign Application Priority Data
Mar. 19, 2012    (JP) .................................. 2012-062357

(51) Int. Cl.
*B29C 33/76*    (2006.01)
*B29D 30/06*    (2006.01)

(52) U.S. Cl.
CPC ........ *B29D 30/0661* (2013.01); *B29D 30/0606* (2013.01); *B29K 2995/0012* (2013.01)

(58) Field of Classification Search
CPC ..... B29D 30/12; B29D 30/0661; B29C 33/76
USPC ............................... 425/54, 55; 156/414, 417
See application file for complete search history.

(56) References Cited

U.S. PATENT DOCUMENTS 1,170,423 A * 2/1916 Denman .......................... 425/55
1,213,525 A * 1/1917 Merriman ........................ 425/55

(Continued)

FOREIGN PATENT DOCUMENTS

| JP | 2003-311741 A | 11/2003 |
| JP | 2006-160236 A | 6/2006 |
| JP | 2006-264018 A | 10/2006 |

(Continued)

OTHER PUBLICATIONS

International Search Report, issued in PCT/JP2013/055137, dated Jun. 4, 2013.

*Primary Examiner* — James Mackey
(74) *Attorney, Agent, or Firm* — Birch, Stewart, Kolasch & Birch, LLP

(57) ABSTRACT

A rigid core for forming a tire is configured so that the non-uniformity of the amount of thermal expansion of the core body is reduced to improve the quality of the tire. The core body comprises divided core pieces (10i, 10o) divided inward and outward in a tire radial direction at a tire radial position (P) including a maximum width position (P0) of the tire forming surface. Outward divided core pieces (10o) disposed outward in the tire radial direction than the maximum width position (P0) and inward divided core pieces (10i) disposed inward in the tire radial direction than the maximum width position (P0) are respectively formed of metal materials different from each other in coefficient of thermal expansion. The coefficient of thermal expansion of the inward divided core piece (10i) is higher than a coefficient of thermal expansion of the outward divided core piece (10o).

2 Claims, 11 Drawing Sheets

(56) References Cited

U.S. PATENT DOCUMENTS 1,366,750 A * 1/1921 Smith et al. ............... 425/56
1,670,446 A * 5/1928 Gammeter ................. 425/55
6,113,833 A * 9/2000 Ogawa ...................... 425/56

2006/0096690 A1   5/2006 Nakata

FOREIGN PATENT DOCUMENTS

JP         2008-207342 A    9/2008

* cited by examiner

FIG.3
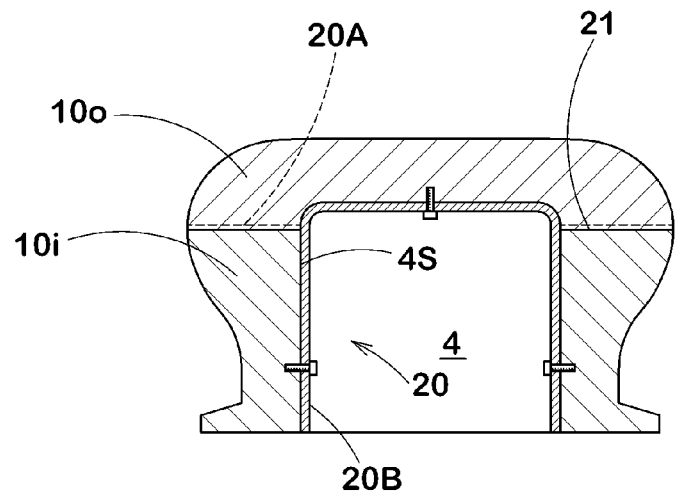
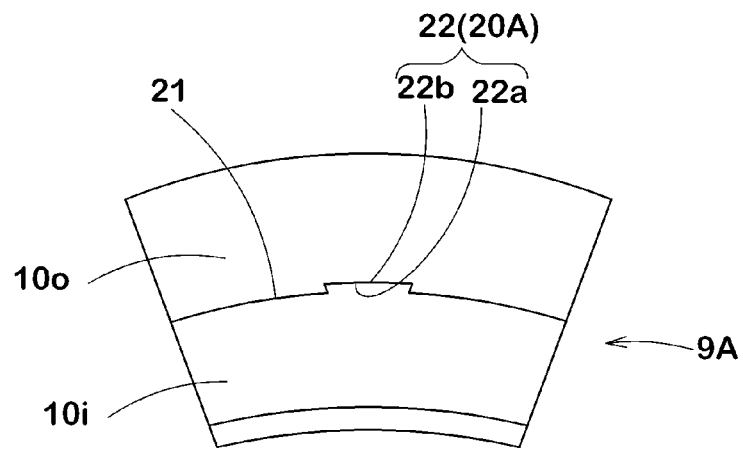
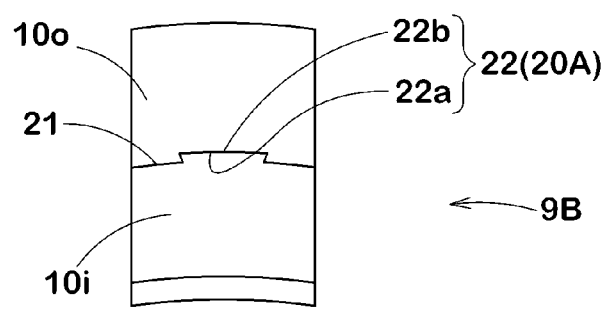

RIGID CORE FORMING TIRE

TECHNICAL FIELD

The present invention relates to a rigid core for forming a tire which is capable of uniformalizing thermal expansion of a core body during vulcanization molding so as to improve quality of a finished tire.

BACKGROUND ART

In recent years, a method for forming a tire using a rigid core (a) including a core body (a1) having a tire forming surface (as) on an outer surface thereof as shown in FIG. 10 (hereinafter generally referred to as "core method") has been proposed to enhance accuracy in forming a pneumatic tire (refer to, for example, patent document 1).

With the core method, tire structural members, such as a carcass ply, a belt ply, a sidewall rubber, and a tread rubber, are sequentially stuck one upon another on the tire forming surface (as) so as to form a green tire (t) having approximately the same shape as a finished tire (corresponding to a tire product after being subjected to vulcanization). The green tire (t), together with the rigid core (a), is then loaded into a vulcanization mold (b) so as to subject the green tire (t) to vulcanization molding between the core body (a1) as an inner mold and the vulcanization mold (b) as an outer mold.

On this occasion, the core body (a1) is heated in the vulcanization mold (b) from a low temperature state of 100° C. or below to a high temperature state of approximately 150° C. in order to subject the green tire (t) to heat vulcanization. Therefore, thermal expansion occurs in the core body (a1), and a shape dimension of the core body (a1) varies in the vulcanization mold (b).

As conceptually shown in FIG. 11(A), thermal expansion in a cross-sectional direction $\epsilon 1$ and thermal expansion in a radial direction $\epsilon 2$ occur as the thermal expansion. The thermal expansion in the cross-sectional direction $\epsilon 1$ is the thermal expansion that causes the outer surface (as) to expand so as to swell outward in a meridional cross section of the core body (a1). The thermal expansion in the radial direction $\epsilon 2$ is the thermal expansion that causes the ring-shaped core body (a1) to expand so as to increase a diameter thereof outwardly in a tire radial direction around a tire axis (i). consequently, as conceptually shown in FIG. 11(B), expansion (d) varies across the cross section of the core body (a1). In particular, the thermal expansion in the radial direction $\epsilon 2$ is added to the thermal expansion in the cross-sectional direction $\epsilon 1$ so as to increase the expansion (d) on a side closer to a tread than a maximum width position P0 of the tire forming surface (as) (namely, on a radially outside). In contrast, the thermal expansion in the radial direction $\epsilon 2$ is subtracted from the thermal expansion in the cross-sectional direction $\epsilon 1$ so as to decrease the expansion (d) on a side closer to a bead than the maximum width position P0 (namely, on a radially inside).

The vulcanization mold (b) is controlled at a constant temperature (for example, approximately 160° C.) over the whole vulcanization process. Therefore, the shape dimension of a cavity surface (bs) of the vulcanization mold (b) remains almost unchanged. The nonuniformity of the expansion (d) of the core body (a1) causes nonuniformity of vulcanizing pressure applied to the green tire (t) (pressing force applied to the cavity surface (bs)). That is, the vulcanizing pressure becomes high on the tread side and low on the bead side. This leads to the problem that the quality of the tire is deteriorated due to insufficient vulcanization on the bead side subjected to the low vulcanizing pressure, and due to difficulties in discharging air remaining within the tire.

RELATED ART DOCUMENT

Patent Document

Patent document 1: Japanese Unexamined Patent Application No. 2006-160236

It is an object of the present invention to provide a rigid core for forming a tire which suppresses the nonuniformity of the thermal expansion of the core body so as to uniformalize the vulcanizing pressure applied to the green tire, thus improving the quality of the tire.

DISCLOSURE OF THE INVENTION

Means of solving the Problems

To achieve the above-mentioned object, the invention according to claim 1, a rigid core for forming a tire comprises a core body provided on an outer surface thereof with a tire forming surface configured to form thereon a green tire by sequentially sticking tire structural members, the rigid core being configured to be loaded together with the green tire formed on the tire forming surface into a vulcanization mold so as to subject the green tire to vulcanization molding between the vulcanization mold and the core body. The core body comprises a plurality of divided core pieces configured to be divided inward and outward in a tire radial direction at a tire radial position P including a maximum width position P0 at which the tire forming surface bulges most outward in a tire axial direction. An outward divided core piece disposed more outward in the tire radial direction than the maximum width position P0, and an inward divided core piece disposed more inward in the tire radial direction than the maximum width position P0 are respectively formed of metal materials different from each other in coefficient of thermal expansion. And a coefficient of thermal expansion of the inward divided core piece is higher than a coefficient of thermal expansion of the outward divided core piece.

According to claim 2, the core body comprises three or more divided core pieces respectively formed of metal materials different from one another in coefficient of thermal expansion, and the divided core pieces have a higher coefficient of thermal expansion as being disposed more inward in the tire radial direction.

Effects of the Invention with the present invention as described above, the core body is made up of the plurality of divided core pieces to be divided inward and outward in the tire radial direction. The divided core piece disposed more outward in the tire radial direction than the maximum width position P0, and the divided core piece disposed more inward in the tire radial direction than the maximum width position P0 are respectively formed of metal materials different from each other in coefficient of thermal expansion. The coefficient of thermal expansion of the divided core piece disposed more inward in the tire radial direction is higher than the coefficient of thermal expansion of the divided core piece disposed more outward in the tire radial direction.

Accordingly, the metal material having a high coefficient of thermal expansion can be used to increase the expansion in the region to be subjected to small expansion due to the radial thermal expansion (namely, the region disposed more radially inward than the maximum width position P0). In contrast, the metal material having a low coefficient of thermal expansion can be used to decrease the expansion in the region to be subjected to large expansion due to the radial thermal expansion (namely, the region disposed more radially outward than the maximum width position P0).

This contributes to minimizing the nonuniformity of expansion over the entire core body 2. consequently, the vulcanizing pressure applied to the green tire during the vulcanization molding can be uniformalized to suppress, for example, insufficient vulcanization to be caused in a region subjected to low vulcanizing pressure, and occurrence of air space within the tire, thereby improving the quality of the tire.

BRIEF DESCRIPTION OF THE DRAWINGS

FIG. 3 is an explanatory drawing showing an embodiment of coupling means for coupling divided core pieces to each other;

MODE FOR CARRYING OUT THE INVENTION

An embodiment of the present invention is described in detail below.

Figure 1:
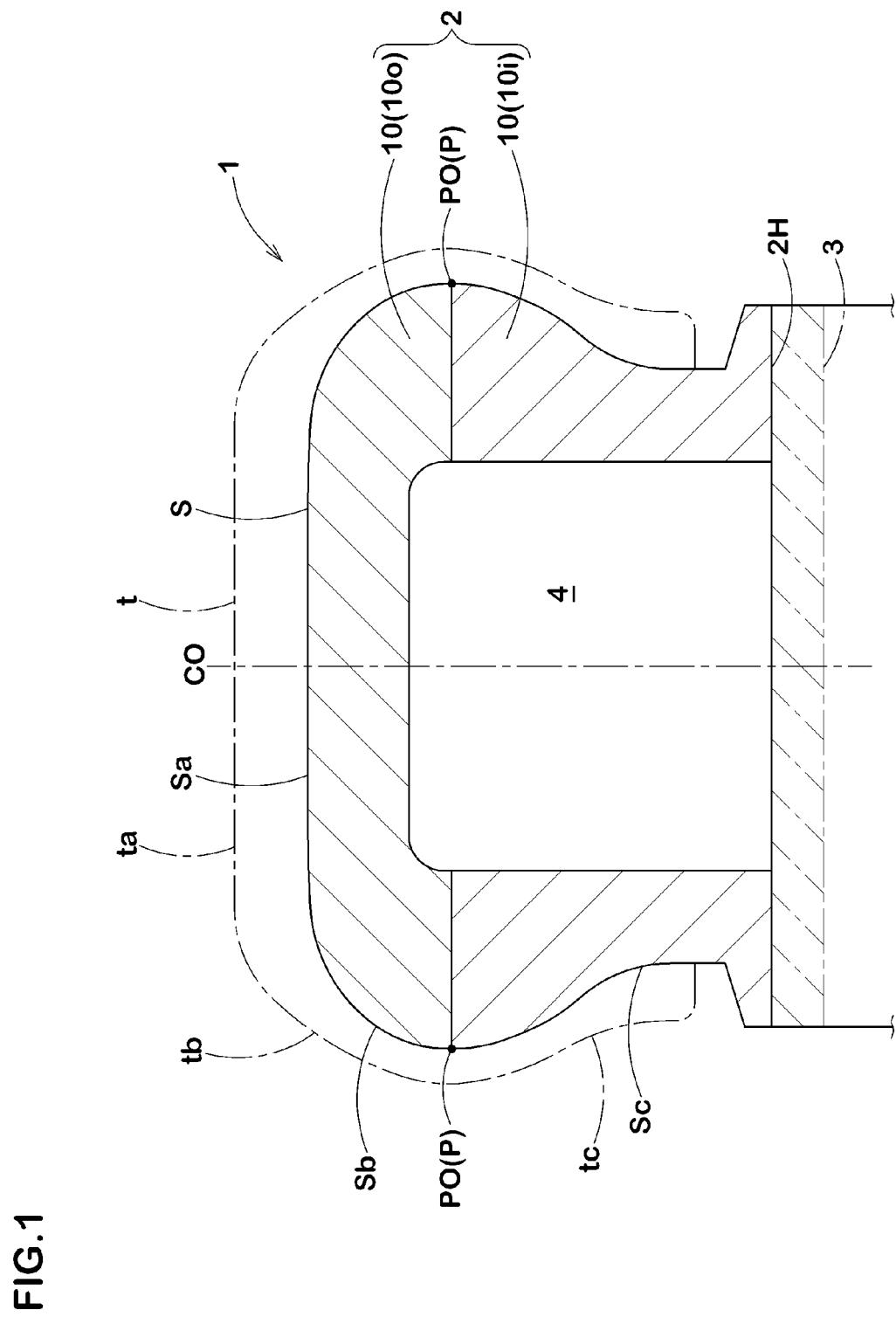
FIG. 1 is a cross-sectional view showing an embodiment of a rigid core for forming a tire according to the present invention.

As shown in FIG. 1, a rigid core 1 of the present embodiment includes an annular core body 2 having a tire forming surface S on an outer surface thereof. Tire structural members, such as a carcass ply, a belt ply, a sidewall rubber, and a tread rubber, are to be sequentially stuck one upon another on the tire forming surface S so as to form a green tire (t) having approximately the same shape as a finished tire. In a similar manner to conventional ones, the green tire (t) is to be loaded together with the rigid core 1 into a vulcanization mold (b) so as to be subjected to vulcanization molding while being heated and pressurized between the core body 2 as an inner mold and the vulcanization mold (b) as an outer mold.

The tire forming surface S includes a tread forming surface region Sa for forming an inner surface of a tread region (ta) of the green tire (t), a sidewall forming surface region Sb for forming an inner surface of a sidewall region (tb), and a bead forming surface region Sc for forming an inner surface of a bead region (tc). The tire forming surface S is to be formed in approximately the same shape as an inner surface shape of the finished tire.

The rigid core 1 includes the core body 2 and a circular cylindrical core 3 to be internally inserted into a center hole 2H of the core body 2. Any well-known structures are applicable to structural members other than the core body 2. Therefore, the following description is given only of the core body 2.

The core body 2 of the present embodiment is in a hollow shape having therein an inner cavity region 4 that is coaxial with the core body 2. Heating means (not shown) for heating the green tire (t) from inside, such as an electric heater, is disposed in the inner cavity region 4. As the heating means, a heated fluid, such as steam, may be filled in the inner cavity region 4.

Figure 2A:
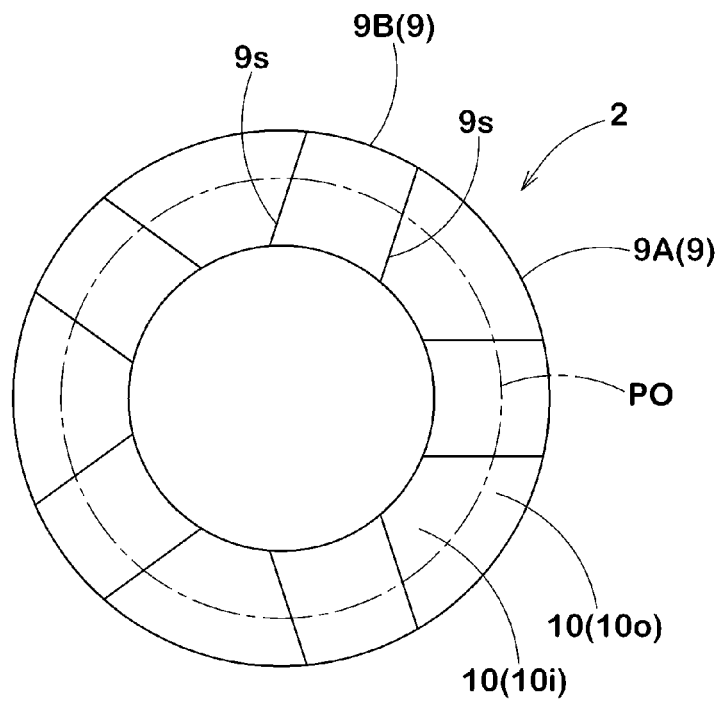
FIGS. 2(A) and 2(B) are respectively a side view and a perspective view of a core body.
Figure 2B:
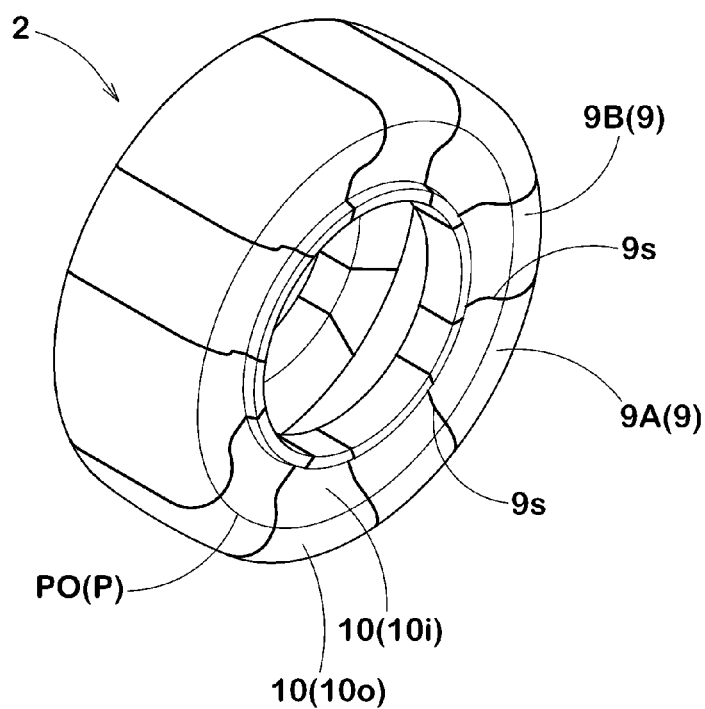

As shown in FIGS. 2(A) and 2(B), the core body 2 is made up of a plurality of core segments 9 divided in a tire circumferential direction. Each of the core segments 9 is made up of first and second core segments 9A and 9B disposed alternately in the circumferential direction. In the first core segment 9A, divided surfaces 9s on both ends in the circumferential direction are inclined radially inward in a direction to decrease a circumferential width. In the second core segment 9B, the divided surfaces 9s on both ends in the circumferential direction are inclined radially inward in a direction to increase the circumferential width. This ensures radially inward sequential movements starting from the second core segment 9B. Thus, the core segments 9 are to be sequentially unloaded from a bead hole of the finished tire after the vulcanization molding so as to disassemble the core body 2. The core 3 inhibits the radially inward movement of the core segments 9 so as to integrally couple the core segments 9 to each other.

As shown in FIG. 1, the core body 2 of the present embodiment is made up of a plurality of divided core pieces 10 to be divided inward and outward in a tire radial direction at a tire radial position P including a maximum width position P0 at which the tire forming surface S bulges most outward in the tire axial direction.

The present embodiment illustrates the case where the tire radial position P consists of only the maximum width position P0. Accordingly, the core body 2 is made up of two divided core pieces 10i and 10o respectively disposed inward and outward in the tire radial direction.

As described above, the core body 2 of the present embodiment is divided into the plurality of core segments 9 in the tire circumferential direction. Therefore in the present embodiment, each of the core segments 9 is made up of the divided core pieces 10i and 10o respectively disposed inward and outward in the tire radial direction. The divided core pieces 10i and 10o respectively disposed inward and outward are to be coupled to each other by coupling means 20 described later so as to form the single core segment 9.

In the divided core pieces 10, the outward divided core piece 10o disposed more outward in the tire radial direction than the maximum width position P0, and the inward divided core piece 10i disposed more inward in the tire radial direction than the maximum width position P0 are respectively formed of metal materials different from each other in coefficient of thermal expansion $\alpha$. Moreover, a coefficient of thermal expansion $\alpha i$ of the inward divided core piece 10i is higher than a coefficient of thermal expansion $\alpha o$ of the outward divided core piece 10o.

With the foregoing configuration of the core body 2, a region to be subjected to small expansion due to the radial thermal expansion (namely, the region disposed more radially inward than the maximum width position P0) permits an increase in expansion because the metal material having the high coefficient of thermal expansion $\alpha i$ is used for the inward divided core piece 10i. In contrast, a region to be subjected to large expansion due to the radial thermal expansion (namely, the region disposed more radially outward than the maximum width position P0) permits a decrease in expansion because the metal material having the small coefficient of thermal expansion $\alpha o$ is used for the outward divided core piece 10o. This contributes to minimizing the nonuniformity of expansion over the entire core body 2 so as to uniformalize the vulcanizing pressure applied to the green tire (t) during the vulcanization molding. For uniformalizing the expansion, a ratio ($\alpha i/\alpha o$) of the coefficients of thermal expansion $\alpha i$ and $\alpha o$ is preferably not less than 1.07, more preferably not less than 1.34.

Here, a coefficient of linear expansion of a solid body and a coefficient of volume expansion of the solid body have the following relationship. Hence, the coefficient of linear expansion or the coefficient of volume expansion may be employed as the coefficient of thermal expansion $\alpha$. Coefficients of linear expansion in major metal materials MA to ME are presented in the following Table 1.

(Coefficient of Volume Expansion)=3×(Coefficient of Linear Expansion)

TABLE 1

| Reference letters | Metal material | Coefficient of thermal expansion α (×E−6) |
|---|---|---|
| MA | aluminum | 23.1 |
| MB | iron | 11.8 |
| MC | aluminum bronze | 15.9 |
| MD | duralumin | 21.6 |
| ME | stainless steel | 14.7 |

For example, one having a structure as shown in FIG. 3 is suitably employed as the coupling means 20. Specifically, in each of the core segments 9A and 9B, the inward divided core piece 10i and the outward divided core piece 10o are adjacent to each other while interposing therebetween a circular cylindrical divided surface 21 that is coaxial with a tire axis (i). The coupling means 20 includes guide means 20A that is formed on the divided surface 21 and allows the inward and outward divided core pieces 10i and 10o to be coupled to each other so as to permit relative movement in the tire axial direction. The present embodiment illustrates the case where the guide means 20A is made of a combination of a guide groove 22a that is buried in one divided surface 21 and extends in the tire axis direction, and a guide rib 22b that is projected on another divided surface 21 and is guided along the guide groove 22a (hereinafter referred to as "a pair of guides 22). FIG. 3 illustrates the case where the guide groove 22a and the guide rib 22b are respectively a so-called dovetail groove and a so-called dovetail tenon each having a trapezoidal cross-section. In this case, the guide means 20A needs only a single pair of guides 22.

Figure 4:
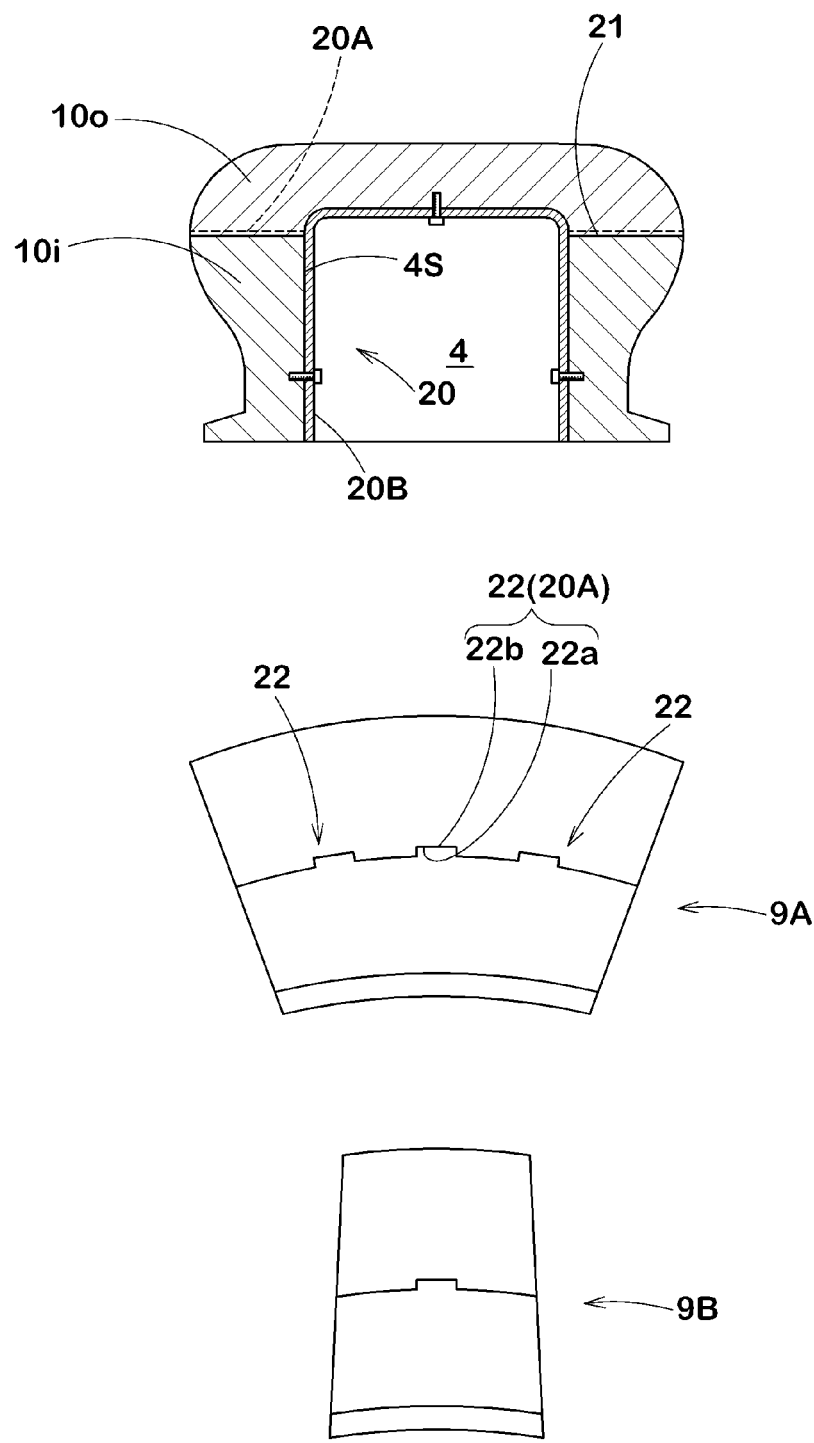
FIG. 4 is an explanatory drawing showing another embodiment of the coupling means.

As shown in FIG. 4, ones having a rectangular cross section may be respectively employed as the guide groove 22a and the guide rib 22b. In this case, a plurality of pairs of guides 22 are preferably disposed toward the tire axis (i) at least in the first core segment 9A that has a wide widht.

The coupling means 20 includes a holder 20B. The holder 20B has, for example, a U-shaped cross section extending along a surface of the inner cavity region 4 (in some cases referred to as "inner hole surface 4S") and makes the inner hole surfaces 4S of the inward divided core pieces 10i and the inner hole surfaces 4S of outward divided core pieces 10o flush. In the present embodiment, the holder 20B and the divided core pieces 10i and 10o are coupled to each other by a screw fitting. The holder 20B does not inhibit the effects of the present invention because when the divided core pieces 10i and 10o are subjected to radial thermal expansion $\epsilon 2$, both can be radially extended and deformed due to the thermal expansion $\epsilon 2$.

Figure 5:
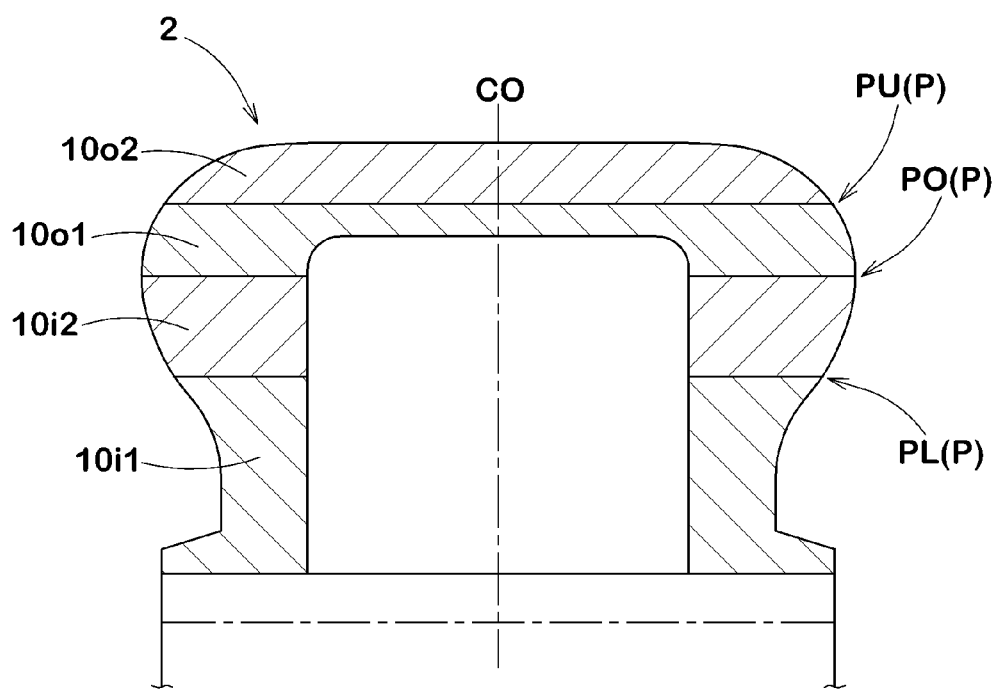
FIG. 5 is a cross-sectional view showing another embodiment of the core body.

The core body 2 can be made up of a plurality of, namely, three or more divided core pieces 10 to be divided inward and outward in the tie radial direction at a plurality of tire radial positions P including the maximum width position P0. FIG. 5 illustrates that the core body 2 is divided into four divided core pieces 10i1, 10i2, 10o1, and 10o2 by the tire radial position P consists of three positions of the maximum width position P0, a tire radial position PU disposed more outward in the tire radial direction than the maximum width position P0, and a tire radial position PL disposed more inward in the tire radial direction than the maximum width position P0.

In the above case, the divided core pieces 10i1, 10i2, 10o1, and 10o2 are preferably respectively formed of metal materials different from one another in coefficient of thermal expansion α. Further, setting is preferably made so that the divided core pieces 10 have a higher coefficient of thermal expansion α as being disposed more inward in the tire radial direction, namely, $\alpha i1 > \alpha i2 > \alpha o1 > \alpha o2$, where the coefficient of thermal expansion of the divided core pieces 10i1, 10i2, 10o1, and 10o2 are respectively $\alpha i1$, $\alpha i2$, $\alpha o1$, and $\alpha o2$.

This ensures further minimizing the nonuniformity of expansion over the entire core body 2 so as to further uniformalize the vulcanizing pressure applied to the green tire (t) during the vulcanization molding. For uniformalizing the expansion, a ratio ($\alpha i2/\alpha o1$) of the coefficients of thermal expansion $\alpha i2$ and $\alpha o1$ is preferably not less than 1.07, more preferably not less than 1.34.

Alternatively, the inward divided core pieces 10i1 and 10i2 may be formed of the same metal material (namely, $\alpha i1 = \alpha i2$), and the outward divided core pieces 10o1 and 10o2 may be formed of the same metal material (namely, $\alpha o1 = \alpha o2$). This case eliminates the advantage of dividing by four, and is undesirable because of disadvantages, such as processing costs for the dividing by four, increase in assembly costs, and accuracy deterioration. This case is, however, practicable.

Figure 6:
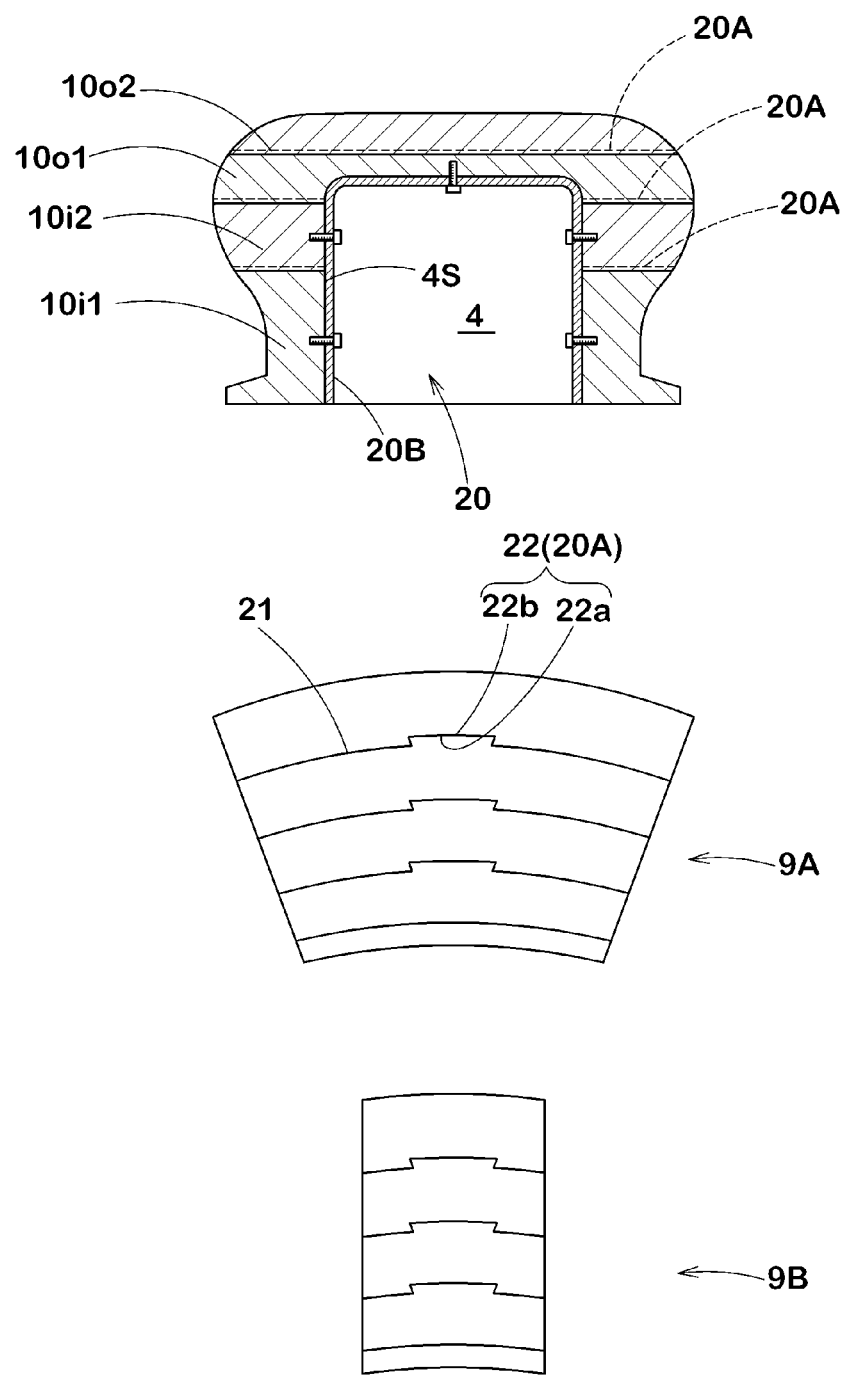
FIG. 6 is an explanatory drawing showing another embodiment of the coupling means for coupling the divided core pieces to each other.
Figure 7:
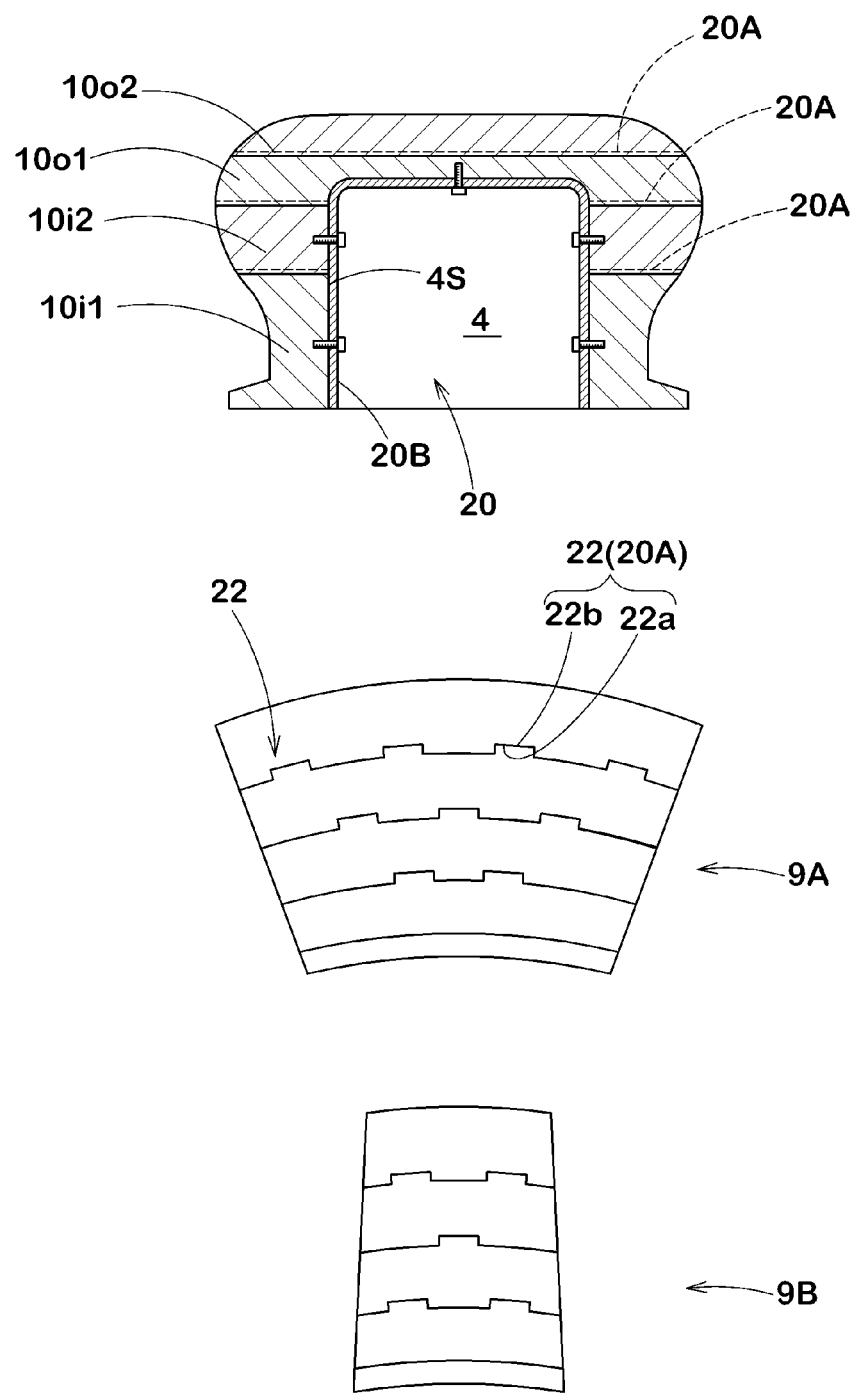
FIG. 7 is an explanatory drawing showing still another embodiment of the coupling means.

The divided core pieces 10i1, 10i2, 10o1, and 10o2 are also coupled to one another by the coupling means 20 so as to form the single core segment 9. The coupling means 20 is similar to the case of dividing by two. As shown in FIGS. 6 and 7, the coupling means 20 includes the guide means 20A for ensuring that the divided core pieces adjacent to each other are coupled to each other so as to permit relative movement in the tire axial direction, and the holder 20B for making the inner hole surfaces 4S of the divided core pieces flush.

Although the particularly preferred embodiment of the present invention has been described in detail, the present invention can be modified and carried out in various embodiments without being limited to the illustrated embodiment.

EXAMPLES

To confirm the effects of the present invention, core bodies for forming a pneumatic tire of a tire size 195/65R15 were produced experimentally based on specifications presented in Table 2. The individual core bodies were subjected to a temperature rise from normal temperature of 20° C. to 150° C. so as to be subjected to thermal expansion, and outer shapes of the individual core bodies were respectively measured using a laser displacement meter.

Figure 8:
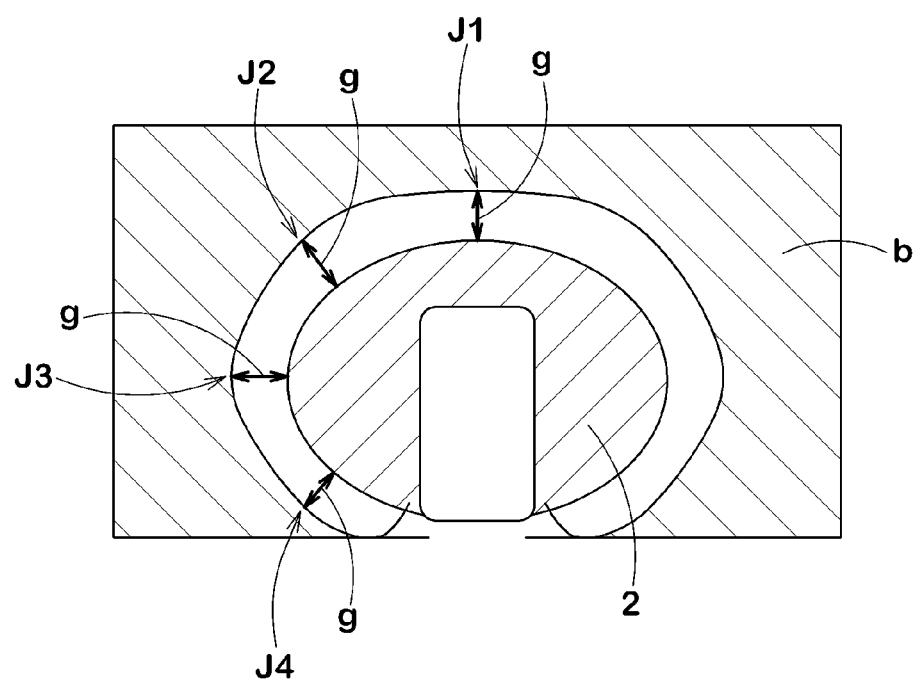
FIG. 8 is a cross-sectional view showing gap evaluation positions presented in Table 2.

Each of measurement results was superimposed with a size of the cavity surface of the vulcanization mold after the thermal expansion so as to obtain a gap (g) with respect to the outer surface of the core body, and the gap (g) was represented by an index. The gap (g) is obtained by representing, by an index, a ratio of the gap of the core body after the thermal expansion to the gap of the core body before the thermal expansion. Table 2 shows the gaps (g) at evaluation positions J1 to J4 shown in FIG. 8. Smaller variations of the gap (g) throughout the evaluation positions J1 to J4 indicates that vulcanizing pressure is uniformalized.

Evaluation position J1 . . . Equator position of the tread region

Evaluation position J2 . . . Buttress region

Evaluation position J3 . . . Maximum width position

Evaluation position J4 . . . Clinch region

Generation situation of airspace within the pneumatic tire when the tire was subjected to vulcanization molding using the core body was represented by an index. A larger value indicates higher frequency of occurrence of air space. Vulcanization temperature conditions during the vulcanization molding are as follows.

Vulcanization mold . . . 160° C.

Core body . . . 150° C.

Figure 9A:
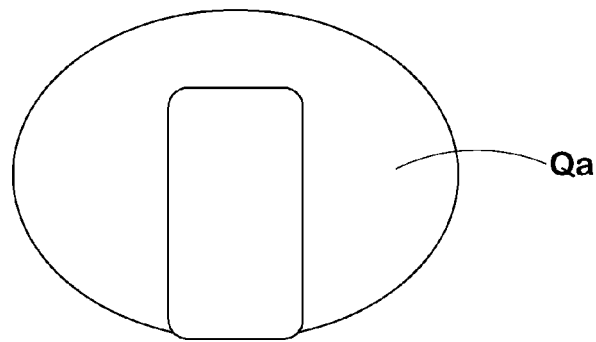
FIGS. 9(A) to 9(c) are conceptual drawings respectively showing structures of the core body presented in Table 2.
Figure 9B:
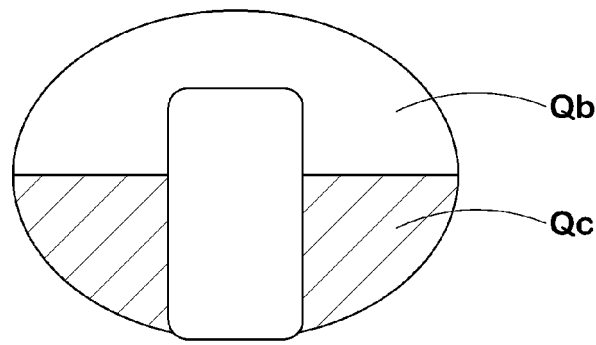
Figure 9C:
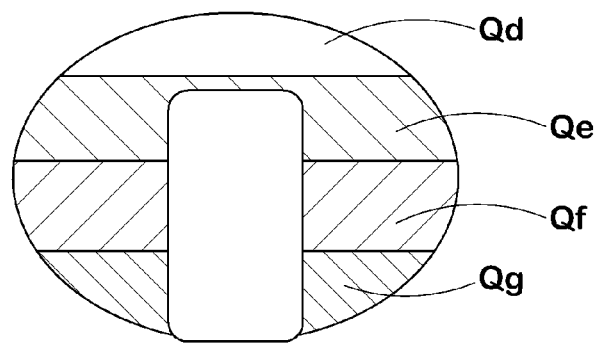
Figure 10:
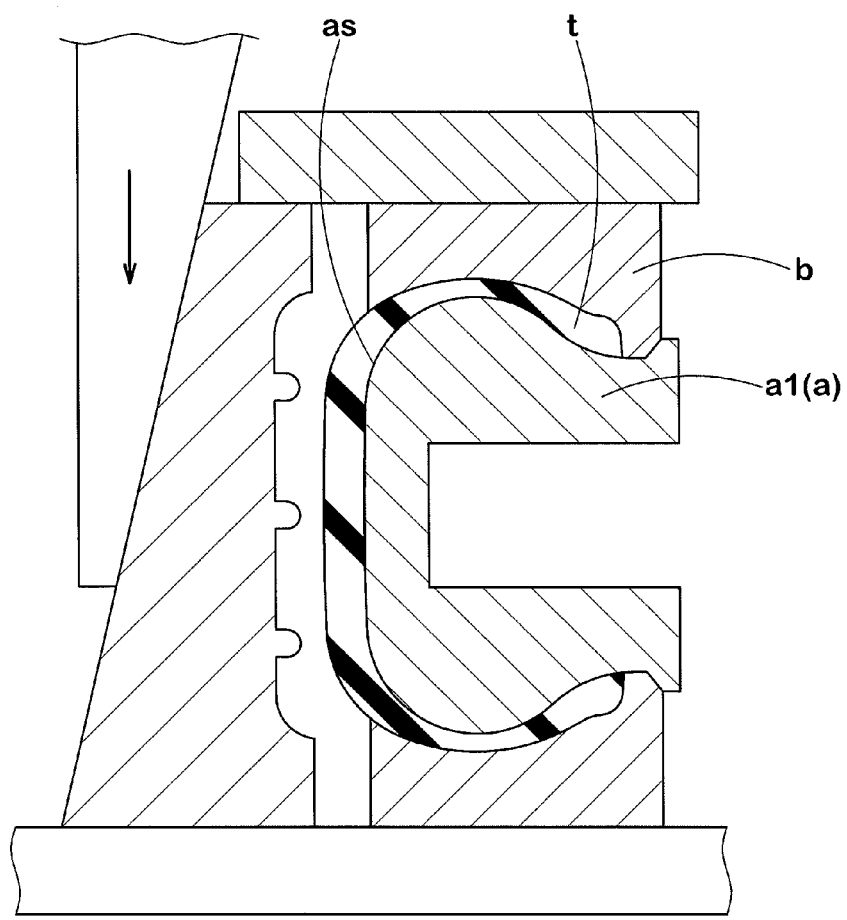
FIG. 10 is a cross-sectional view for explaining a core method.
Figure 11A:
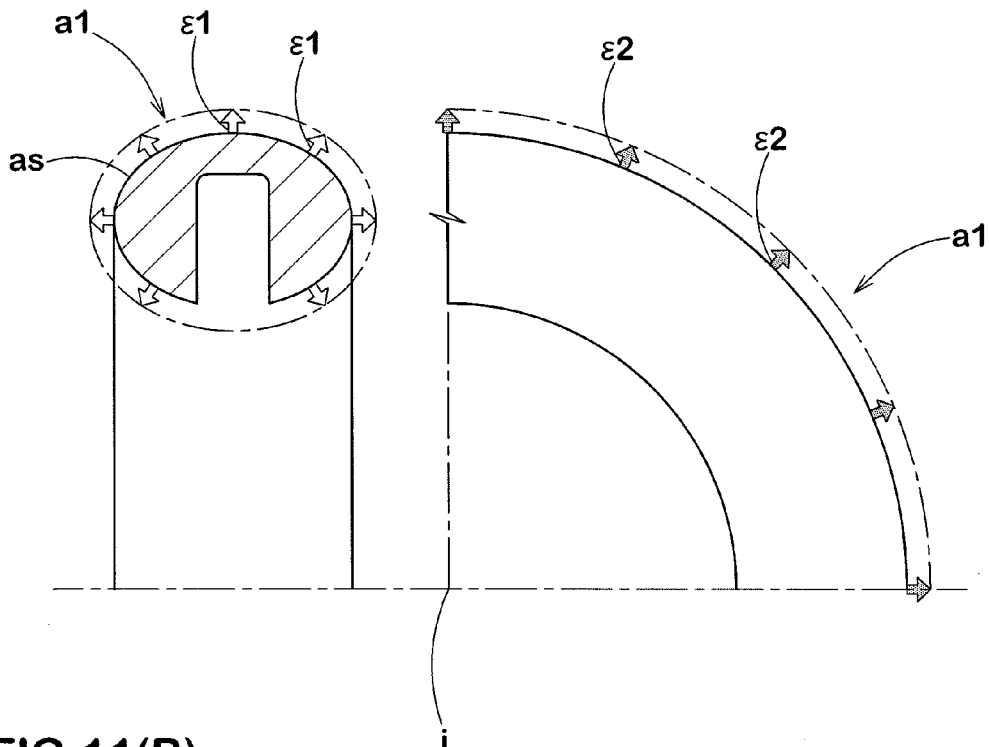
FIGS. 11(A) and 11(B) are conceptual drawings for explaining problems in a conventional rigid core.
Figure 11B:
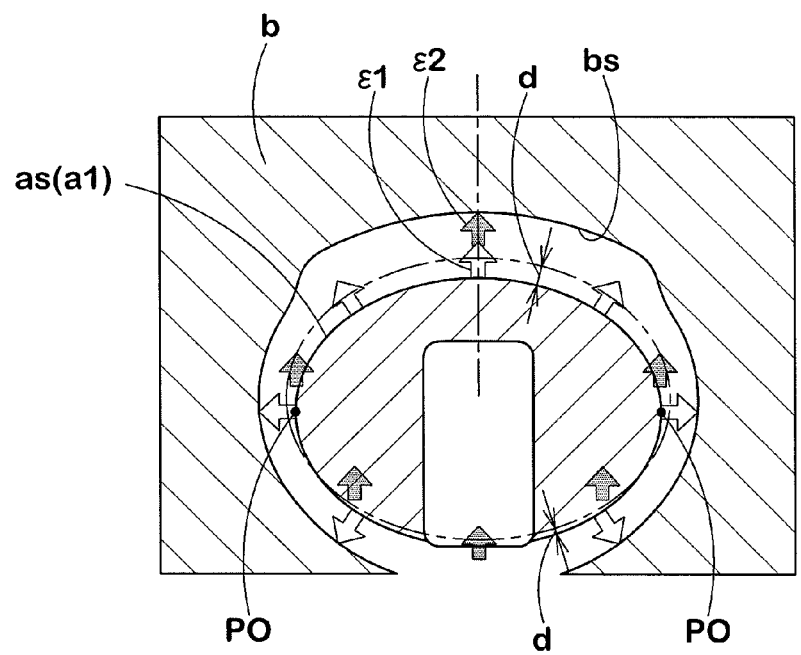

FIGS. 9(A) to 9(C) respectively conceptually show structures of the core body. The metal materials MA to ME used in the individual regions are presented in Table 1.

TABLE 2

| | Comp. Ex. 1. | Comp. Ex. 2 | Ex. 1 | Ex. 2 | Ex. 3 | Ex. 4 | Ex. 5 |
|---|---|---|---|---|---|---|---|
| Core Body | | | | | | | |
| Internal structure | FIG. 9(A) | FIG. 9(A) | FIG. 9(B) | FIG. 9(B) | FIG. 9(B) | FIG. 9(B) | FIG. 9(B) |
| Number of core pieces | 1 | 1 | 2 | 2 | 2 | 4 | 4 |
| Metal material | | | | | | | |
| Region Qa | MA | MB | — | — | — | — | — |
| Region Qb | — | — | MB | MB | MD | — | — |
| Region Qc | — | — | MA | MC | MA | — | — |
| Region Qd | — | — | — | — | — | MB | ME |
| Region Qe | — | — | — | — | — | ME | MC |
| Region Qf | — | — | — | — | — | MD | MD |
| Region Qg | — | — | — | — | — | MA | MA |
| Gap | | | | | | | |
| Evaluation position J1 | 3 | 6 | 6 | 6 | 5 | 6 | 5 |
| Evaluation position J2 | 4 | 7 | 7 | 7 | 6 | 5 | 5 |
| Evaluation position J3 | 6 | 8 | 5 | 7 | 5 | 5 | 5 |
| Evaluation position J4 | 8 | 10 | 7 | 9 | 7 | 5 | 5 |
| Air space | 7 | 8 | 4 | 5 | 3 | 2 | 1 |

As apparent from Table 2, it can be confirmed that Examples are capable of uniformalizing the vulcanizing pressure applied to the green tire during the vulcanization molding so as to suppress the occurrence of air space within the tire, thereby improving the quality of the tire.

DESCRIPTION OF THE REFERENCE NUMERAL

1 rigid core
2 core body
10 divided core piece
b vulcanization mold
S tire forming surface
t green tire

The invention claimed is:
1. A rigid core for forming a tire comprising:
a core body provided on an outer surface thereof with a tire forming surface configured to form thereon a green tire by sequentially sticking tire structural members, the rigid core being configured to be loaded together with the green tire formed on the tire forming surface into a vulcanization mold so as to subject the green tire to vulcanization molding between the vulcanization mold and the core body,
wherein the core body comprises a plurality of divided core pieces configured to be divided inward and outward in a tire radial direction at a tire radial position P including a maximum width position P0 at which the tire forming surface bulges most outward in a tire axial direction,
wherein an outward divided core piece disposed more outward in the tire radial direction than the maximum width position P0, and an inward divided core piece disposed more inward in the tire radial direction than the maximum width position P0 are respectively formed of metal materials different from each other in coefficient of thermal expansion, and
wherein a coefficient of thermal expansion of the inward divided core piece is higher than a coefficient of thermal expansion of the outward divided core piece.

2. The rigid core for forming a tire according to claim 1, wherein the core body comprises three or more divided core pieces respectively formed of metal materials different from one another in coefficient of thermal expansion, and the divided core pieces have a higher coefficient of thermal expansion as being disposed more inward in the tire radial direction.

\* \* \* \* \*